US005530244A

United States Patent [19]

Sriram et al.

[11] Patent Number: 5,530,244

[45] Date of Patent: Jun. 25, 1996

[54] SOLID STATE DETECTOR FOR SENSING LOW ENERGY CHARGED PARTICLES

[75] Inventors: Saptharish Sriram, Monroeville; Carl B. Freidhoff, Murrysville, both of Pa.

[73] Assignee: Northrop Grumman Corporation, Linthicum, Md.

[21] Appl. No.: 320,466

[22] Filed: Oct. 7, 1994

Related U.S. Application Data

[63] Continuation-in-part of Ser. No. 124,873, Sep. 22, 1993, Pat. No. 5,386,115.

[51] Int. Cl.[6] .............................. B01D 55/44; H01J 49/00

[52] U.S. Cl. .............................................. 250/281; 250/288

[58] Field of Search .................................... 250/281, 282, 250/427, 288

[56] References Cited

U.S. PATENT DOCUMENTS

| | | | |
|---|---|---|---|
| 3,636,345 | 1/1972 | Hirschel | 250/296 |
| 4,866,267 | 9/1989 | Matsuda et al. | 250/296 |
| 4,938,742 | 7/1990 | Smits | 604/67 |
| 5,043,576 | 8/1991 | Broodhurst et al. | 250/293 |
| 5,072,115 | 12/1991 | Zhou | 250/281 |
| 5,091,645 | 2/1992 | Elliott | 250/294 |
| 5,120,958 | 6/1992 | Davis | 250/292 |
| 5,209,119 | 5/1993 | Polla et al. | 73/723 |
| 5,386,115 | 1/1995 | Freidhoff et al. | 250/281 |

OTHER PUBLICATIONS

W. J. Spencer, "An Electronically Controlled Peizoelectric Insulin Pump and Valves", *IEEE Trans, Sonics and Ultrasonic*, vol. SU-25, No. 3, p. 153 (1978).

H. T. G. VanLintel et al., "A Piezoelectric Micropump Based on MIcromachining of Silicon", 15 *Sensors and Actuators*153 (1988).

J. G. Smits, "Piezoelectric Micropump With Three Valves Working Peristaltically", A21 *Sensors and Actuators*203 (1990).

J. W. Judy et al., "Surface-Machined Micromechanical Membrane Pump", *Proceedings of IEEE Micro Electro*Mechanical Systems (Nara. Japan), (1991).

P. Schiller et al., "Design And Process Considerations For Ferroelectric Film-Based Piezoelectric Pressure Sensors", *4th International Symposium on Integrated Ferroelectrics*(1992).

P. Schiller et al. "Integrated PIezoelectric Microactuators Based on PZT Thin Films", *7th International Conference on Solid State Sensors And Actuators, p. 154 (1993).*

R. Bruchhaus et al., "Investigation of Pt Bottom Electrodes For 'In-Situ' Deposited Pb(Zr, Ti) $O_3$ (PZT) Thin Films", 2453 *MRS Symp. Proc.*101 (1991).

K. Streenivas et al., "Investigation of Pt/Ti Bilayer Metallization on Silicon For Ferroelectric Thin Film Integration", 75 (1) *J. Appl. Phys.*232 (1994).

*Primary Examiner*—Bruce C. Anderson

[57] ABSTRACT

A detector is provided for use in a solid state mass spectrograph for analyzing a sample of gas. The detector is adapted to detect the filtering of an ionized sample of the gas. The detector includes a linear array of detector elements, each detector element being connected to a Faraday cage having v-shaped conductors. The Faraday cage is formed on a cavity provided in a semiconductor substrate upon which the solid state mass-spectrograph is constructed. The detector elements include signal generators located outside of the cavity and connected to the Faraday cage, and charge sensing means in the form of either a MOS switch or a charge-coupled device.

6 Claims, 3 Drawing Sheets

SOLID STATE DETECTOR FOR SENSING LOW ENERGY CHARGED PARTICLES

GOVERNMENT CONTRACT

The government of the United States of America has rights in this invention pursuant to Contract No. 92-F-141500-000, awarded by the United States Department of Defense, Defense Advanced Research Projects Agency.

CONTINUING APPLICATION

This application is a continuation-in-part of application Ser. No. 08/124,873, filed Sep. 22, 1993, now U.S. Pat. No. 5,386,115.

BACKGROUND OF THE INVENTION

1. Field of the Invention

This invention relates to a gas-detection sensor and more particularly to a solid state mass spectrograph which is micro-machined on a semiconductor substrate, and, even more particularly, to a solid-state detector used in such a mass spectrograph.

2. Description of the Prior Art

Various devices are currently available for determining the quantity and type of molecules present in a gas sample. One such device is the mass-spectrometer.

Mass-spectrometers determine the quantity and type of molecules present in a gas sample by measuring their masses. This is accomplished by ionizing a small sample and then using electric and/or magnetic fields to find a charge-to-mass ratio of the ion. Current mass-spectrometers are bulky, bench-top sized instruments. These mass-spectrometers are heavy (100 pounds) and expensive. Their big advantage is that they can be used in any environment.

Another device used to determine the quantity and type of molecules present in a gas sample is a chemical sensor. These can be purchased for a low cost, but these sensors must be calibrated to work in a specific environment and are sensitive to a limited number of chemicals. Therefore, multiple sensors are needed in complex environments.

A need exists for a low-cost gaseous detection sensor that will work in any environment. U.S. patent application Ser. No. 08/124,873, filed Sep. 22, 1993, hereby incorporated by reference, discloses a solid state mass-spectrograph which can be implemented on a semiconductor substrate. FIG. 1 illustrates a functional diagram of such a mass-spectrograph 1. This mass-spectrograph 1 is capable of simultaneously detecting a plurality of constituents in a sample gas. This sample gas enters the spectrograph 1 through dust filter 3 which keeps particulates from clogging the gas sampling path. This sample gas then moves through a sample orifice 5 to a gas ionizer 7 where it is ionized by electron bombardment, energetic particles from nuclear decays, or in a radio frequency induced plasma. The mass filter 11 applies a strong electromagnetic field to the ion beam. Mass filters which utilize primarily magnetic fields appear to be best suited for the miniature mass-spectrograph since the required magnetic field of about 1 Tesla (10,000 gauss) is easily achieved in a compact, permanent magnet design. Ions of the sample gas that are accelerated to the same energy will describe circular paths when exposed in the mass-filter 11 to a homogenous magnetic field perpendicular to the ion's direction of travel. The radius of the arc of the path is dependent upon the ion's mass-to-charge ratio. The mass-filter 11 is preferably a Wien filter in which crossed electrostatic and magnetic fields produce a constant velocity-filtered ion beam 13 in which the ions are disbursed according to their mass/charge ratio in a dispersion plane which is in the plane of FIG. 1.

A vacuum pump 15 creates a vacuum in the mass-filter 11 to provide a collision-free environment for the ions. This vacuum is needed in order to prevent error in the ion's trajectories due to these collisions.

The mass-filtered ion beam is collected in a ion detector 17. Preferably, the ion detector 17 is a linear array of detector elements which makes possible the simultaneous detection of a plurality of the constituents of the sample gas. A microprocessor 19 analyses the detector output to determine the chemical makeup of the sampled gas using well-known algorithms which relate the velocity of the ions and their mass. The results of the analysis generated by the microprocessor 19 are provided to an output device 21 which can comprise an alarm, a local display, a transmitter and/or data storage. The display can take the form shown at 21 in FIG. 1 in which the constituents of the sample gas are identified by the lines measured in atomic mass units (AMU).

In any ionic mass spectrometer or charge sensing device, there must be some means to collect the charge and determine its magnitude. For high performance devices, sensitivity of 10's of charges at speeds of 10's of kilocycles is required. An additional resolution constraint is mandated for mass spectrographs: the detector pitch must be smaller than the ion beam while insuring that the ion beam is not missed due to interdetector spacing of non-contiguous detector elements. As detector pitch is reduced, smaller displacements (i.e., better mass resolution in a miniaturized package) can more readily be discerned.

In the present state of the art, charge multiplication devices and high gain current sensors have been utilized. Charge multiplication devices require high voltages (>1000 volts) in order to operate. This is difficult to implement on a silicon chip where voltages are generally less than 100 volts. High gain current amplifiers, often referred to as electrometers, operate at low voltages and can be used to measure total charge. Electrometers typically found in laboratory instruments are useful for currents on the order of $1\times10^{-14}$ amperes. However, this sensitivity is at the expense of speed, with response time approaching several seconds for these low current values.

Another charge sensor which is typically used for the detection of light and high energy particles is the charge-coupled device (CCD). Photoelectrons generated at a capacitor or charge injection from a high energy particle onto a capacitor are moved by the CCD to a charge sensitive amplifier and converted to a voltage signal which can be sensed. CCDs are capable of sensing low amounts of charge (some as low as 10's of charges per read cycle) with read rates in the 10's of kilocycles, but require a passivating dielectric over the charge storage capacitor to protect the active CCD semiconductor layers from environmental degradation. This dielectric precludes sensing of low energy molecular and atomic ions.

High speed and low charge sensing devices capable of accurately detecting low energy molecular and atomic ions are required to effectively miniaturize ionic gas sensors. Accordingly, there is a need for a solid-state detection for sensing low energy charge particles.

SUMMARY OF THE INVENTION

A miniaturized detector is provided for use in a solid state mass-spectrograph which can sense low energy charge particles at high speeds. The solid state mass-spectrograph is constructed upon a semiconductor substrate having a cavity provided therein. The detector includes a linear array of detector elements. Preferably, each detector element is connected to a Faraday cage having v-shaped conductors which are formed on the cavity provided in the semiconductor substrate. The detector elements include signal converter/amplifiers and logic switches located outside of the cavity and connected to the Faraday cage. The detector can utilize either a MOS switch or a CCD encapsulated in a passivating dielectric to detect the ion charges.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE PREFERRED EMBODIMENTS

Figure 1:
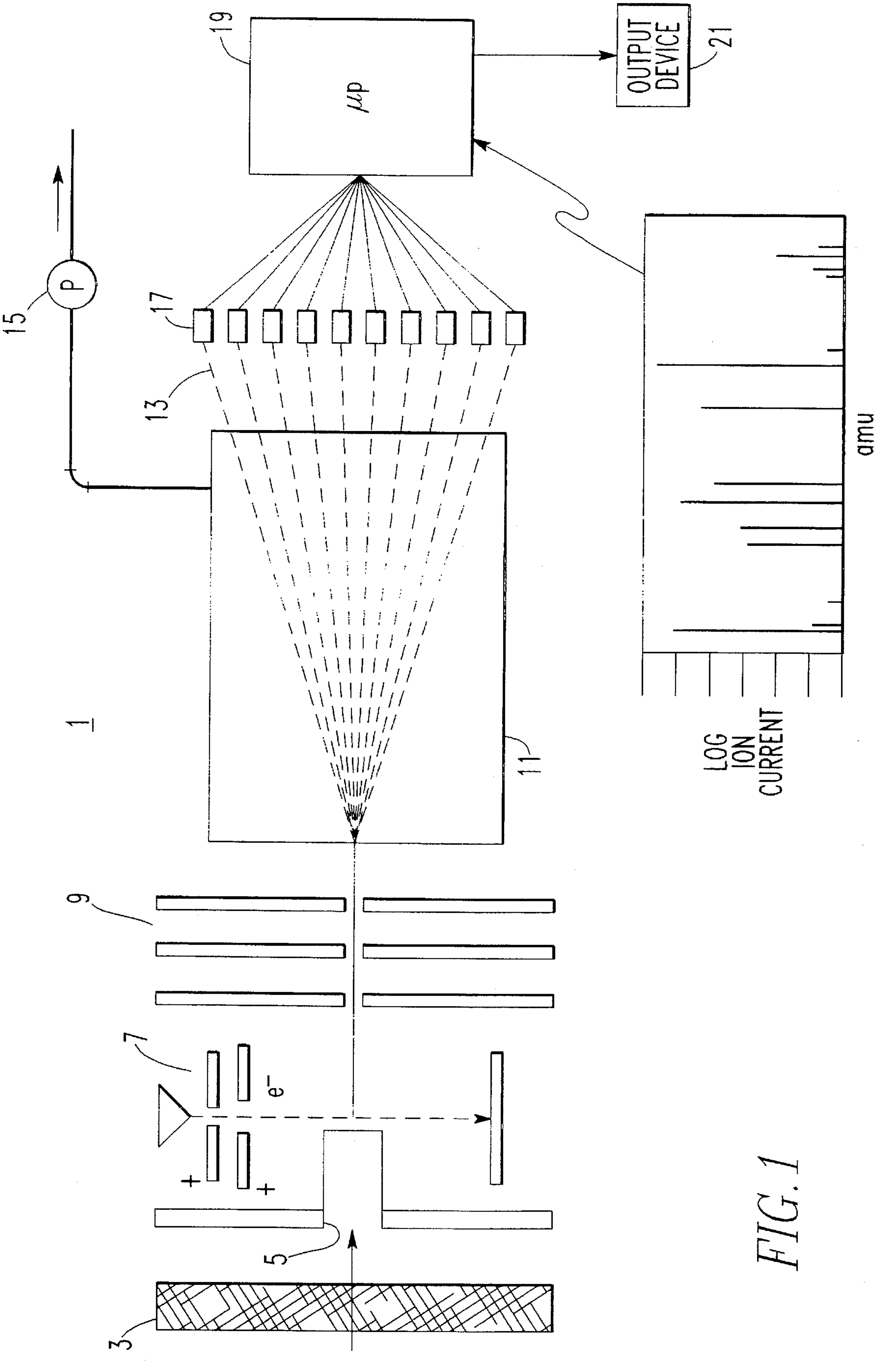
FIG. 1 is a functional diagram of a solid state mass spectrograph in accordance with the invention.
Figure 2:
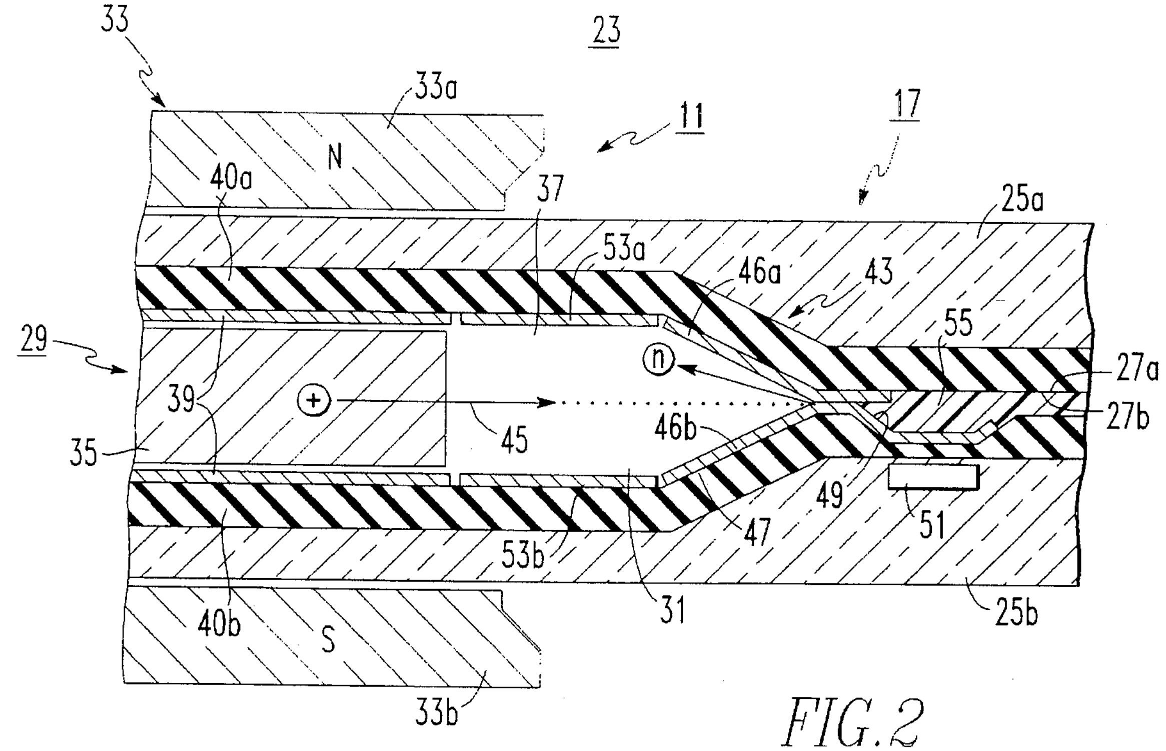
FIG. 2 is a longitudinal fractional section through a portion of the mass spectrograph of the invention.
Figure 3:
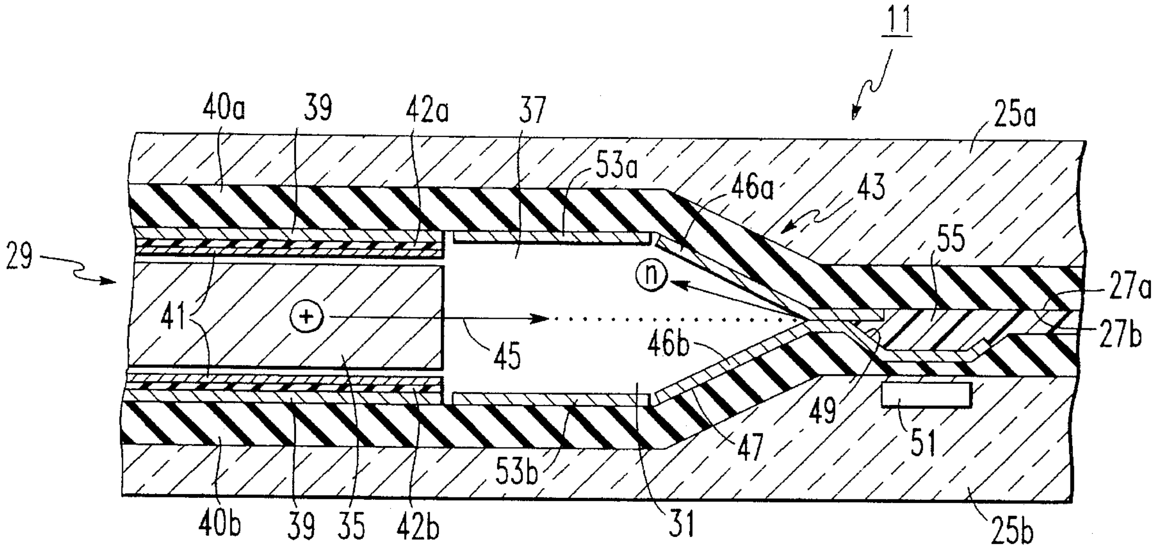
FIG. 3 which is similar to FIG. 2, illustrates another embodiment of the invention.

The mass spectrograph 1 of FIG. 1 is implemented in a semiconductor chip 23 as shown in FIGS. 2 and 3. Chip 23 is about 20 mm long 10 mm wide and 0.8 mm thick. Chip 23 comprises a substrate of semiconductor material formed in two halves 25*a* and 25*b*, which are joined along longitudinal extending parting surfaces 27*a* and 27*b*. The two substrate halves 25*a* and 25*b* form at their parting surfaces 27*a* and 27*b* an elongated cavity 29. This cavity 29 has an inlet section, a gas ionizing section, a mass filter section, and a detector section of which only detector section 31 is shown.

As shown in FIGS. 2 and 3, a permanent magnet 33 is provided about the mass filter section of cavity 29. Permanent magnet 33 has upper and lower pull pieces 33*a* and 33*b* which straddle the substrate halves 25*a* and 25*b* to produce a magnetic field which is perpendicular to the path of the ions. The orthogonal electric field for the Wien filter used in the preferred embodiment of the invention is produced by opposed electrodes 35 formed on the side walls 37 of the mass filter section of the cavity 29. As shown in FIGS. 2 and 3, additional pairs of opposed trimming electrodes 39 are spaced along the top and bottom walls of the mass filter section of cavity 29. A spectrum of voltages is applied to these additional electrodes to make the electric field between the electrodes 35 uniform. These additional electrodes 39 are made of non-magnetic, electrically-conductive materials such as gold so that they do not interfere with the magnetic field products by the permanent magnet 33. These electrodes 39 are deposited on an insulating layer of silicon dioxide 40*a* and 40*b* lining the cavity 29.

Figure 4:
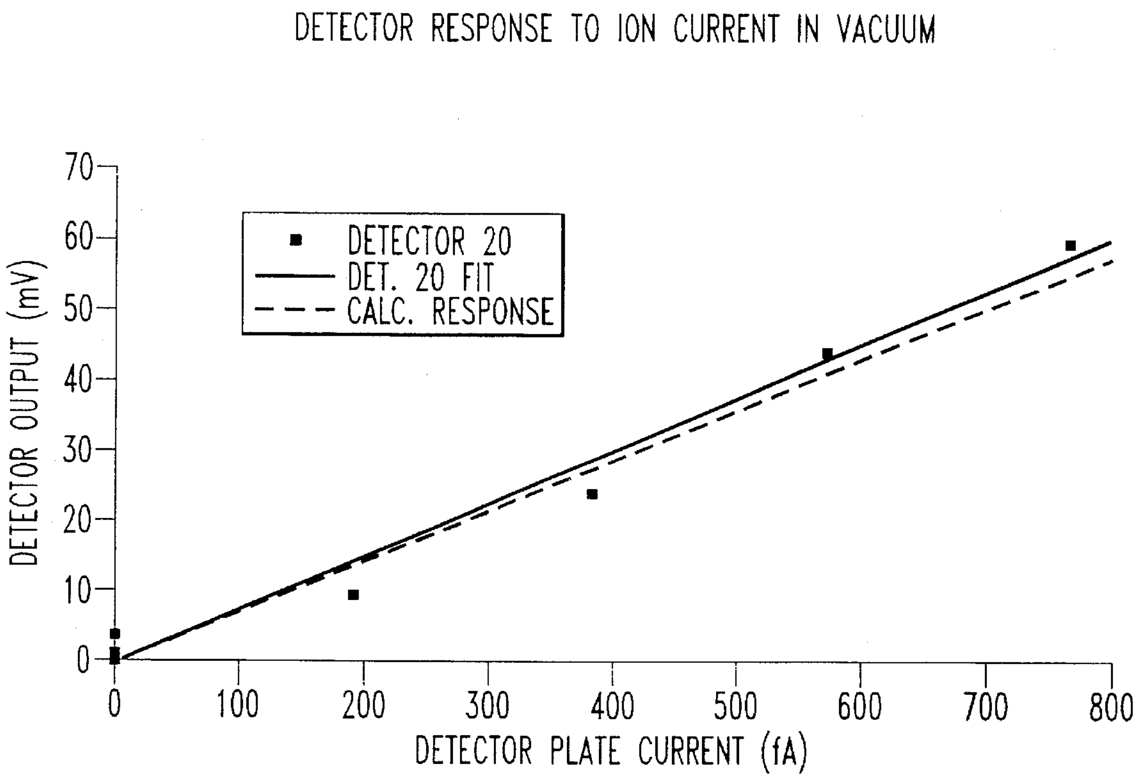
FIG. 4 is a graph showing the response of a detector in accordance with the present invention to ion current in a vacuum.

As an alternative to the permanent magnet 33, the magnetic field for the mass filter can be generated by a magnetic film 41 deposited on the insulating silicon dioxide layers 40*a* and 40*b* on the top and bottom walls of the mass filter section of the cavity 29 as shown in FIG. 4. In the embodiment, the electric field trimming electrodes 39 are deposited on an insulating layer of silicon dioxide 42*a* and 42*b* covering the magnetic film 41.

The ion detector 17 of FIG. 1 preferably is a linear array of detector elements 43 oriented in the dispersion plane 45 (perpendicular to the planes shown in FIGS. 2 and 3) at the end of the detector section 31 of the cavity 29. The exemplary array has 64 detector elements or channels 43. The detector elements 43 each include a Faraday cage formed by a pair of converging electrodes 46*a* and 46*b* formed on the surfaces of a v-shaped groove 47 formed in the end of the cavity 29. The Faraday cages increase signal strength by gathering ions that might be slightly out of the dispersion plane 45, through multiple collisions.

The electrodes 46*a* and 46*b* of the Faraday cage extend beyond the end of the cavity 29 along the parting surfaces 27*a* and 27*b* of the substrate halves 29*a* and 29*b*. These electrodes 46*a* and 46*b* are plated onto the insulating layers 40*a* and 40*b* of the silicon dioxide formed in the two substrate halves 25*a* and 25*b*. The electrode 46*b* extends into a recess 49 in the insulating silicon dioxide layer 40 to form a capacitor pad for a charged couple device (CCD) or metal oxide semiconductor (MOS) switch device 51 formed in the substrate half 25*b*. The ions are dispersed by the mass filter 11 in the dispersion plane 45 to strike a detector element as determined by their mass/charge ratio. When the ion strikes the electrode 46*a* or 46*b* of the detector element 43, its charge is neutralized. The charge required to neutralize the ion is read out by the CCD or MOS 51.

Isolating electrodes 53*a* and 53*b* are grounded to isolate the detector elements from the fields of the mass filter. A sealant 55 fills the recess 49 and joins the two substrate halves 25*a* and 25*b*.

Scaling down of a mass-spectrograph to the micron level requires low charge sensing. MOS (Metal-Oxide Semiconductor) switches or CCDs with novel charge injection scheme can provide such low charge sensing. MOS switch arrays and CCDs are solid state devices which are both fast and very sensitive. For linear arrays, such as array 17 in FIG. 1, MOS switches are easier to fabricate and are comparable to CCDs in performance and therefore, are the preferred embodiment.

State of the art MOS switches and CCD arrays are encapsulated in a passivating dielectric to protect the active device from environmental deterioration. This dielectric is too thick for low energy molecular and atomic ions to penetrate and reach the collecting capacitor. Therefore, these devices will not sense low energy particles.

In the present MOS implementation, the charge collecting electrode of the capacitor is a bare metal, preferably gold, which is exposed in the mass separation region. Gold is preferred due to its low chemical activity at ambient conditions (i.e., it does not oxidize or react at room temperature). Charges directed onto the metal electrode deposit their charge, become neutral gas species and are removed from the mass filter section via pumps. In mass spectrograph 1, the collecting electrode 43 can be formed into a "V" to enhance the collection efficiency by forming a 2-dimensional Faraday cage. In this case, the ions can potentially collide with the collection electrode surface a number of times, increasing the probability of the charge becoming collected. This configuration is illustrated in FIGS. 2 and 3. The charge is then conducted along an isolated metal line to the CMOS switch circuit, located external to the mass filter section, which controls the readout and resetting of each collection capacitor. The readout and signal processing are performed using double correlated sampling.

The size of the capacitor 51 is bounded by a number of factors which determine sensitivity performance. These factors include: noise induced by the capacitor; the leakage of the capacitor; and the space charge limit on the ion current which can be generated and transported through the ion optics.

The detector circuit due to its semiconductor nature possesses a number of noise sources which must be considered in order to determine the correct size of the detector pad. These noise factors come from the collection capacitor itself, and shot noises from the current flowing as a leakage through the capacitor dielectric and MOS switch. A presently preferred embodiment has reduced the leakage current to below 10 fA. Therefore, the dominant noise factor is the root mean square noise from the capacitor 51 itself. Uncertainty in the detected charge follows the equation:

$$rms\ \text{noise}=(k*T*C/q)^{0.5},$$

where k is the Boltzmann constant, T is the temperature in degrees Kelvin, C is the capacitance of the charge collecting electrode and q is the value of an elemental charge ($1.6\times10^{-19}$ charges per coulomb). The design capacitance for the collecting electrode is 200 fF, and the rms noise is 183 charges at 300° K. Using 1 micrometer of silicon oxide as the capacitor dielectric, the size of the collection electrode for 200 fF is roughly 15 micrometers×250 micrometers. A capacitance between 100 and 1,000 fF can be used with this device to maintain reasonable signal to noise ratios. Larger capacitances require either wider or longer pads.

The ion beam is designed to have a width of approximately 20 micrometers at resolutions which give less than 1 amu resolution on the detector array. A ten micrometer wide aperture is magnified by the ion optic system by a factor of two. Therefore, to maintain adequate resolution in desired areas of the mass range and to match design rules for cost-effective silicon foundries, a pitch of 22 micrometers was chosen for the detector array. For a mass filter width of 1500 micrometers, 64 array elements will be fabricated at the end of the mass filter. Larger capacitors would require long lines or higher dielectric constant insulators in the present design.

At the small end of the detector size scale, the voltable developed on the capacitor during charging, and the photolithographic design rules for the collection pads over the mass filter regions' well wall and the definition of the readout circuitry dominate. The electrical scheme of the detector array is such that the reset voltage of the collection electrodes is between 6 and 12 volts below system ground. The ion energy is set at 5 volts above system ground, so the collection capacitors potential will not come up to a value which will electrostatically repel the incoming ions. If the potential change of the collection capacitor is significant, then the efficiency of the ion collection would be affected.

An ion from a gas with 100% concentration would deposit 26,870,000 charges onto a single collection capacitor. This would charge the 200 fF collection capacitor to about 50 mV above its original voltage. This is only a fraction of the 11 to 17 volts difference with which the collection electrodes will be relative to the ion energies. Ideally designed collection electrodes will keep the charging voltage to less than 1 V to maintain the same efficiency in collecting the charges for low and high intensity ion beams. The smallest capacitor by this criteria is 20 fF, which would be only about 2 micrometers wide for the collection pad. This pitch would require sub-micron design rules to fabricate the readout circuitry connected to the collection capacitor. The performance does not require this for present applications, but can be used in the future.

With an ionization electron current of 1 microamp in a 10 micrometer diameter beam and a gas pressure of 100 mTorr, a 10×26 micrometer opening will draw approximately 4300 pA of positive ion current. Approximately 1% of the extracted ion beam is anticipated to reach the detector array with most of the losses occurring at the ion optic apertures. This results in approximately 43 pA traversing the mass filter region. The calculated space charge limit for this region is 3400 pA for nitrogen at 5 eV, so the current is many orders of magnitude below the space charge limit. Capacitors in the range of 100 fF to 1,000 fF are preferred to accommodate low sensitivity (ppm) and high dynamic range (3 orders of magnitude). This capacitance consists primarily of the Faraday cage, and to a lesser extent, the metal interconnect between the cage and external MOS switch. This novel approach enables the bulk of the capacitor to remain a bare metal surface and therefore sensitive to low energy molecular and atomic ions, since environmental issues are not a major concern in the evacuated mass filter cavity.

For an ion with a concentration of 100 ppm, the amount of charge which would be detected by the detector array in a 100 millisecond integration time is 2600 charges. This gives a signal to noise ratio of greater than 14 for the low current signal from a gas with a concentration of 100 ppm.

Charge-coupled devices (CCD) used in the capacitor mode require a lead connecting the charge collecting well with the metal collecting electrode, which is a novel design. The fabrication of the CCD linear array is much more complicated than for the MOS switch linear array, and therefore is the second preferred embodiment.

A twenty element array has been fabricated and subjected to an ion beam. The response of the detector array is shown in FIG. 4. A broad ion beam with known cross section was directed onto an electrically isolated metal plate which contained a small aperture through which ions were directed onto the detector array's collection electrodes. The current striking the metal plate was measured with an electrometer and the area ratio taken to determine the current striking each collection electrode. The horizontal axis is the current striking the array collection electrode. The vertical axis is the voltage out of the amplifier interface card for the extreme element on the array. The dotted line is the anticipated response and the line is the fit for the detector data. There is good agreement between the fitted detector response and the system design response.

while specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims in any and all equivalents thereof.

We claim:

1. A detector for use in a solid state mass spectrograph for analyzing a sample of gas, said detector detecting the filtering of an ionized sample of said gas, said detector comprising a linear array of detector elements, each detect or element connected to a Faraday cage means having v-shaped conductors formed on a cavity provided in a semiconductor substrate, said detector elements including signal generators located outside of said cavity and connected to said Faraday cage means, said detector further comprising a MOS switch provided in a passivating dielectric, said MOS switch providing a low charge sensing means.

2. The detector of claim 1 wherein said MOS switch includes a capacitor having a bare metal charge collecting electrode.

3. The detector of claim 2 wherein said charge collecting electrode is made from gold.

4. The detector of claim 1 wherein one of said v-shaped conductors forms a capacitor pad for said MOS switch.

5. The detector of claim 1 wherein said detector further comprises a charge-coupled device switch provided in a passivating dielectric, said charge-coupled device switch providing a low charge sensing means.

6. The detector of claim 5 wherein one of said v-shaped conductors forms a capacitor pad for said charge-coupled device switch.

* * * * *